United States Patent [19]
Teich

[11] Patent Number: 6,088,826
[45] Date of Patent: Jul. 11, 2000

[54] METHOD FOR CHECKING DATA FOR ERRORS IN DATA COMMUNICATION SYSTEMS

[75] Inventor: Paul R. Teich, Austin, Tex.

[73] Assignee: Advanced Micro Devices Inc., Sunnyvale, Calif.

[21] Appl. No.: 08/915,691

[22] Filed: Aug. 21, 1997

Related U.S. Application Data

[60] Provisional application No. 60/038,616, Mar. 7, 1997.

[51] Int. Cl.[7] .................................. H04L 1/00; H04L 1/20
[52] U.S. Cl. ........................................... 714/774; 714/776
[58] Field of Search .................................. 714/774, 752, 714/776, 799

[56] References Cited

U.S. PATENT DOCUMENTS

| | | | |
|---|---|---|---|
| 4,638,476 | 1/1987 | Acampora et al. | 370/83 |
| 4,654,853 | 3/1987 | Moriyama et al. | 371/41 |
| 5,652,783 | 7/1997 | Keba et al. | 370/313 |
| 5,761,223 | 6/1998 | Ando et al. | 371/41 |

OTHER PUBLICATIONS

Park, S. et al., "Analysis of the Jointly Adapting and Asynchronously Configured V.32 Modem Implementation", IEEE 1058–6393/91, pp. 683–688, Dec. 1991.

*Primary Examiner*—Stephen M. Baker
*Attorney, Agent, or Firm*—Foley & Lardner

[57] ABSTRACT

A data communication method includes evaluating a data frame to determine vulnerability of the data carried by the data frame, setting a flag to a first state to indicate vulnerable data which should be checked for errors by a destination system, and setting the flag to a second state to indicate invulnerable data which should not be checked for errors by the destination system. In another aspect of the invention, a data communication method includes evaluating a data bus to determine the waveform of data transmitted on the data bus, and determining a scope of error detection and correction for the destination address to carry out based on the waveform quality.

5 Claims, 2 Drawing Sheets

METHOD FOR CHECKING DATA FOR ERRORS IN DATA COMMUNICATION SYSTEMS

RELATED APPLICATIONS

This application claims priority to Provisional application 60/038,616, filed Mar. 7, 1997.

BACKGROUND OF THE INVENTION

1. Field of the Invention

This invention relates to a method for error checking transferred data in data communication systems. More specifically, this invention relates to a method for making a real time determination of whether to check data frames for errors in data communication systems.

2. Related Art

Data communications involve the transfer of information from one computing element to another. The type of traffic carried by a data communication system defines the requirements of the communication medium and the access methodology. The communication medium generally carries three kinds of traffic: voice, video, and data files.

Data files are divided into frames or packets of a size that the data communication system, or data network, can handle. The frames generally contain six elements—flags, frame-control information, a source address, a destination address, the payload, and cyclical redundancy check bits. The flags in a frame include a unique set of bits or characters that identify the frame's start and end. The frame control information identifies the frame type—most often whether it is a payload or control frame. The source address identifies the station transmitting the data. The destination address identifies the intended end station. The payload contains the data to be processed. The cyclical redundancy check bits determine whether the frame accumulated errors during transmission.

In some data communication systems, such as wide-area networks (WANs), errors in transmission occur fairly regularly. In these high error systems, transmissions are checked for errors at every intermediate node, and the intermediate node feeds back the status (correct or incorrect) to the previous node. Older networks, such as the X.25 packet network, use this error checking methodology. When an intermediate node detects an incorrectly received frame, the node may request retransmission of the frame. Complete error checking at every node swells the communications overhead, but works the best in systems with high error rates. For example, with a noisy medium, if packets were not checked at every node, virtually none would reach its destination, and throughput would drop near zero as the system would do nothing but retransmit bad packets.

In other data communication systems, such as local-area networks (LANs), where fewer errors occur, the system does not check for errors until the frame has reached its final destination. In frame relay systems, each frame is forwarded to the next node without checking for errors. This shrinks network storage requirements and delay. Of course, when an error is discovered, the system must resend the bad frame over the entire communications path. Another type of data communication technology is asynchronous transfer mode (ATM) technology. ATM technology employs cells with a fixed length of fifty-three bytes. The ATM cell typically has a forty-eight byte payload which carries a data message and a five byte header. The header contains mostly routing information for moving the cells from one communication system node to the next.

In ATM communication systems, each data frame may have a bit which indicates whether the frame is high priority or low priority. Some frames contain more important data than others. For instance, in a channel carrying video, the synchronization information is more important than the information about the individual pixels on the video screen. If the synchronization information is lost, the entire screen is affected, whereas the loss of a group of pixels has less subjective effect on viewing quality. The user and the system network generally determine the percentage of high priority frames at network setup time. The source system, where the frame originates, may designate mandatory frames as high priority and merely optional frames as low priority. Designating frames high priority or low priority provides a mechanism for alleviating overtrafficking in the data network. If overtrafficking occurs in an ATM system, a congested frame relay switch may discard low priority cells before discarding high priority ones.

With the advent of ATM systems, a need arose for streamlining error checking of the data frames. Checking each data frame for errors is a potentially time consuming and congestion-inducing network task.

The difficulty suggested in the preceding is not intended to be exhaustive but rather is among many which tend to reduce the effectiveness of prior error checking methods in data communication systems. Other noteworthy problems may also exist; however, that presented above should be sufficient to demonstrate that such methods appearing in the past will admit to worthwhile improvement.

SUMMARY AND OBJECTS OF THE INVENTION

Accordingly, it is therefore a general object of the invention to provide a data communication method which will obviate or minimize difficulties of the type previously described.

It is a specific object of the invention to provide a data communication method which enables a real time determination of whether to check data frames for errors.

It is another object of the invention to provide a data communication method which saves transmission and data processing time.

It is still another object of the invention to provide a data communication method which avoids congestion or overtrafficking of the data communication system.

A preferred embodiment of the invention which is intended to accomplish at least some of the foregoing objects includes the following steps: evaluating a data frame to determine vulnerability of the data carried by the data frame; setting a flag to a first state to indicate vulnerable data which should be checked for errors by a destination system; and setting the flag to a second state to indicate invulnerable data which should not be checked for errors by the destination system. In a preferred embodiment, the destination address reads the flag. If the flag is set at the first state, the system checks the frame for errors. Should the system detect errors, the system then performs error correction on the frame. If the flag is set at the second state, the system does not perform an error check.

Another preferred embodiment of the invention includes the following steps: evaluating a data bus to determine the waveform of data transmitted on the data bus; and determining a scope of error detection and correction for the destination address to carry out based on the waveform quality. In this embodiment, the system informs the destination address of the scope of error correction and detection.

The data received by the destination address is processed according to the determined scope of error correction and detection.

BRIEF DESCRIPTION OF THE DRAWING

Other objects and advantages of the present invention will become apparent from the following detailed description of a method according to the invention taken in conjunction with the accompanying drawings, in which.

DETAILED DESCRIPTION OF THE INVENTION

Figure 1:
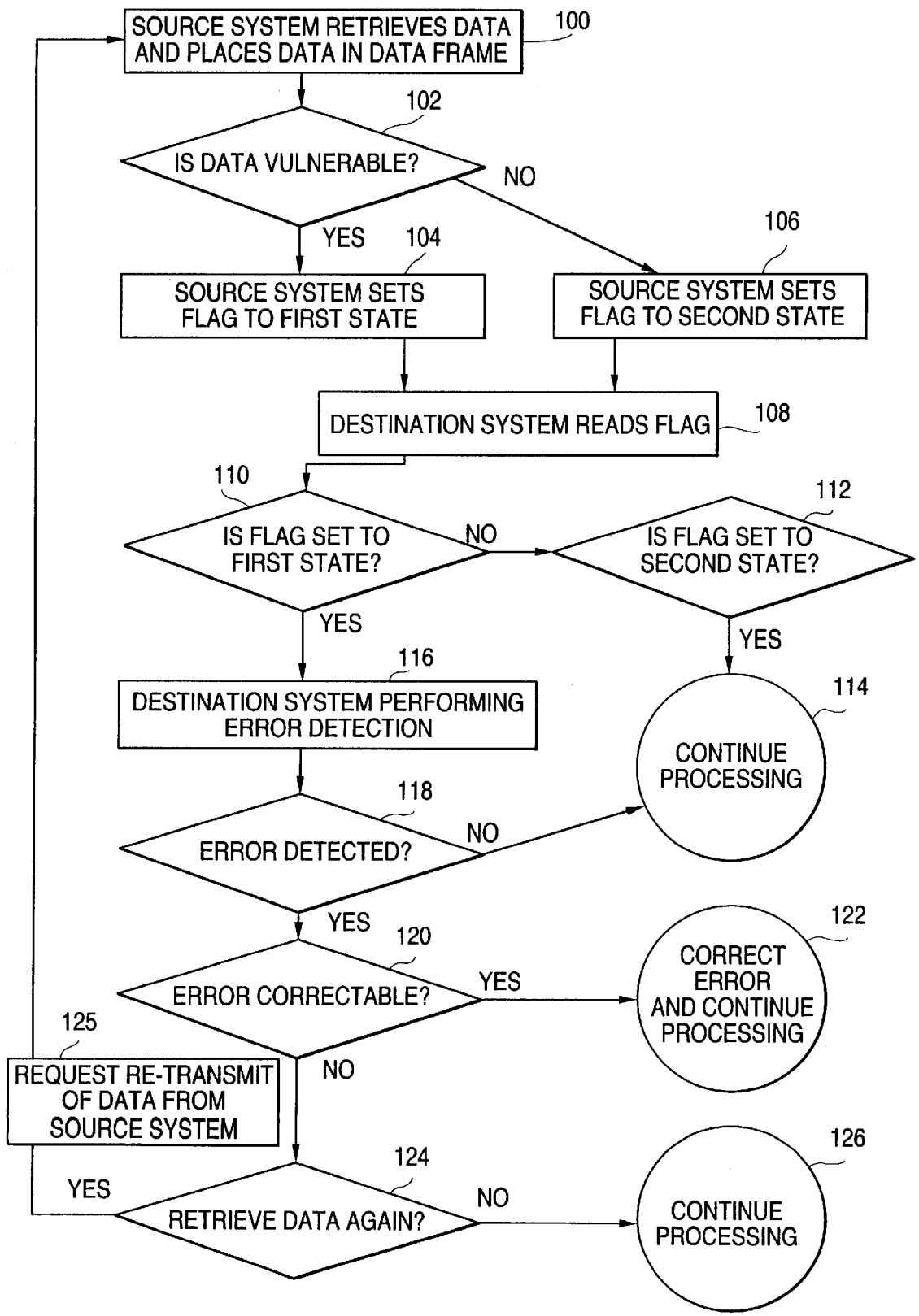
FIG. 1 is a schematic illustrating a first embodiment of the subject data communication method in accordance with the invention.

Referring now to the drawings, wherein like numerals indicate like parts, and initially to FIG. 1, there will be seen a flow diagram illustrating a data communication method primarily for use in an ATM system. The subject data communication method determines whether to check data in a data frame for errors. In step 100, a source system retrieves data from memory and places it in a data frame. The source system then determines if the data is vulnerable in step 102. Vulnerable data represents data where the integrity of the data is important and errors will not be tolerated during processing. Examples of vulnerable data include bank statements, pie or bar charts, or any data dependent on precise numerical calculations. Examples of error-tolerant, invulnerable data include digital audio data and video data.

The source system sets a flag, preferably in the frame header, to identify whether the data is vulnerable or invulnerable. If the data is vulnerable, step 104 directs the source system, where the data frame originates, to set the flag to a first state. On the other hand, if the data is not vulnerable, step 106 directs the source system to set the same flag to a second state. The flag may consist of a single bit or series of bits. In one example, the flag may be set at a 0 to represent the first state and a 1 to represent the second state. In this example, a flag encoded 1 would signify that robust, invulnerable data is carried in the frame, and a flag encoded 0 would signify that fragile, vulnerable data is carried in the frame. After the flags have been set, the data frame is transmitted over the data communication system to the destination system.

In step 108, a destination system reads the flag. In step 110, the destination system determines if the flag is set to the first state. If not, the destination system then determines if the flag is set to a second state as shown in step 112. When the flag is at the second state, the destination system may continue processing the data, as shown in step 114.

Where the destination system determines that the flag is set to the first state, the destination system performs error detection on the payload, or data-containing portion, of the data frame, as shown in step 116. If an error is detected in step 118, the destination system then determines whether the error is correctable in step 120. If no error is detected in step 118, then the destination system continues to process the data in the data frame.

If, in step 120, the destination system determines that the error is correctable, then the destination system corrects the error and continues to process the data frame, as shown in step 122. Otherwise, the destination system must determine whether the source system should retrieve the data again, as shown in step 124. If so, the method requests re-transmit of the data from the source system, as shown in step 125, and then resumes with step 100. If not, the system stops processing the data frame in step 126.

Because the system knows how to treat corrupt data frames, and only performs error checking of vulnerable frames, transmission of data across the data communications system is sped up. Moreover, the system suffers less traffic congestion than would occur if every data frame were checked for integrity. The subject invention also reduces system traffic by only requiring retransmission from the source system of vulnerable frames having errors and not robust frames having errors.

In a preferred embodiment of the invention, error correction and detection occurs at the destination level after the frames have been assembled. It will be recognized that although the above description involves error detection and correction at the frame level, error detection and correction may be performed at the packet level in accordance with the invention. For example, alternating packets or every Nth packet, where N represents any integral, may be checked for errors at the destination system. In addition, it will be understood that, in other data communication networks, network nodes or other data network junctions may perform the steps allocated to the destination system in this preferred embodiment of the invention.

Figure 2:
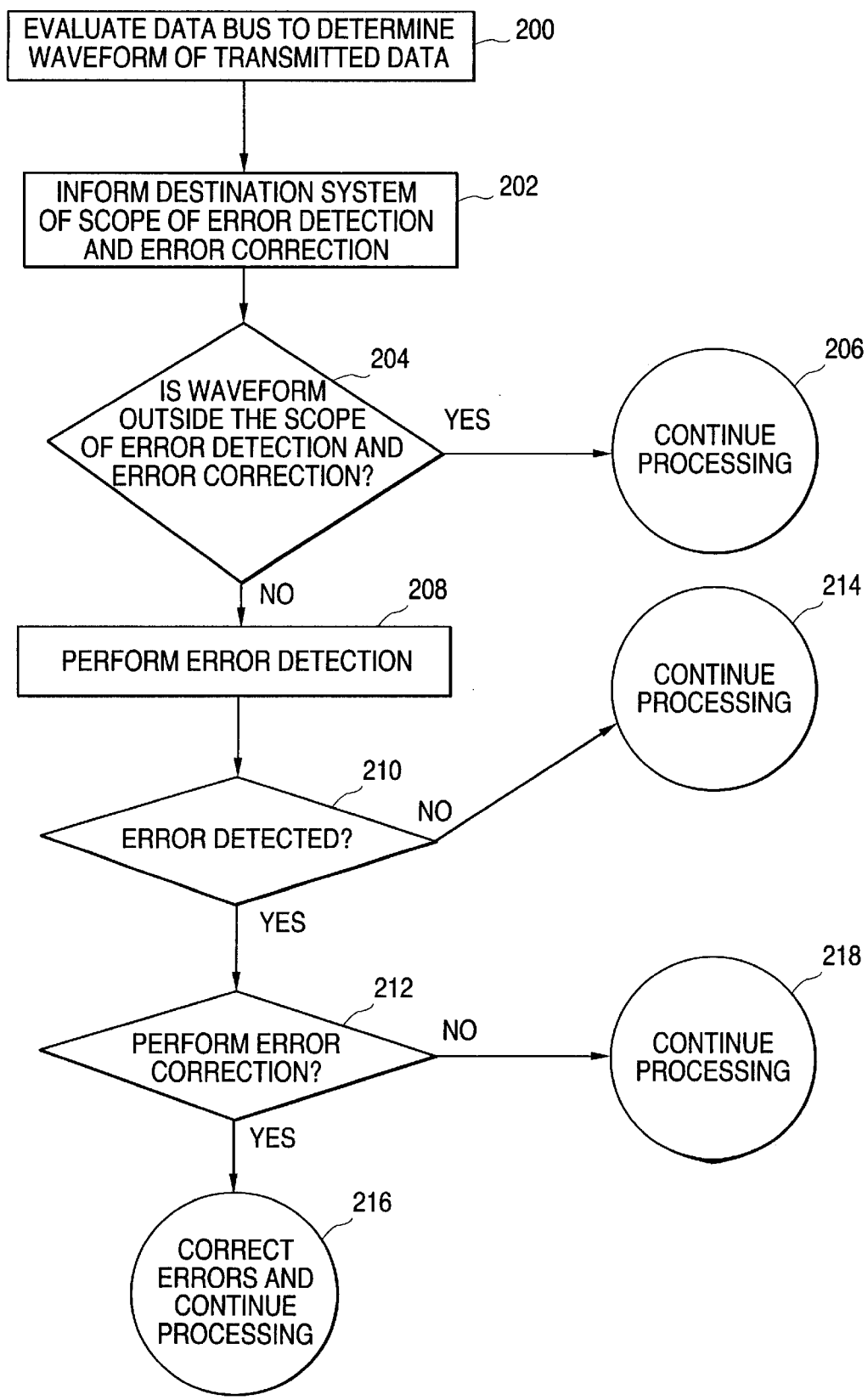
FIG. 2 is a schematic illustrating a second embodiment of the subject data communication method in accordance with the invention.

FIG. 2 shows a flow diagram illustrating another embodiment of the subject invention. This embodiment envisions a network of source systems and destination systems interconnected by a data bus; however, it will be recognized that this embodiment also contemplates radio or other airwave transmission of data.

In step 200 of this embodiment, the source system evaluates a data bus on which data is transmitted to determine the waveform of the transmitted data. If noise invades the waveform, and the data thus is not readily decipherable upon reaching the destination system, then the waveform is classified as fragile. If, on the other hand, the waveform is clear, then waveform is classified as robust. A destination system's treatment of robust and fragile waveforms differs in accordance with the invention. More error detection and correction will be performed for transmissions of fragile waveforms.

Step 202 involves informing the destination system of the scope of any error detection or correction to be performed by the destination system upon receipt of the data transmitted on the waveform. The source system may determine the scope of error detection and correction to be performed by the destination system based on a predetermined set of possible scopes of error detection and correction. This determination may be made prior to transmission of the data on the data bus. The source system preferably sets at least one bit in a data frame transmitted on the data bus to indicate the determined scope of error detection and correction. The destination system receives this determined scope and performs error detection and correction accordingly.

When the destination system receives the data, the destination system determines whether the waveform is outside the predetermined scope of error detection and correction, as shown in step 204. If it is, then the destination system continues to process the data transmitted on the data bus, as shown in step 206. When the waveform falls within the predetermined scope of error detection and correction, step 208 indicates that the destination system performs error detection. After assessing whether errors exist in step 210, and concluding that they do, the destination system then must determine whether to perform error correction, as shown in step 212. Where no errors exist, step 214 shows that the destination system continues to process the data.

If the source has identified the waveform as one on which the destination system must perform error correction, the destination system does so, as shown in step 216. Otherwise, the destination system continues to process the data as shown in step 218.

One example of the above embodiment may be illustrated by assuming that a waveform is essentially noise-free at 5 volts. When the waveform falls between 4.8 and 5.2 volts, less stringent error checking measures are needed. For example, a filter may simply filter out the noise. In this case, the source system will set a bit in the data frames transmitted on the data bus to inform the destination system to use less stringent error checking measures. In this same example, noise infiltrates the waveform between 4.0–4.8 volts and 5.2–5.5 volts, and, thus, more stringent error correction measures are required. For example, the error detection and correction measures may entail cross-correlation to determine the true value of the transmitted signal. Here, the source system will set the bit to inform the destination system to use more stringent error checking measures. It will be recognized that the bit identifying the scope of error detection and correction may comprise a series of bits.

In another aspect of the invention, the source system initially may set a bit to indicate that all data frames transmitted over a data bus must be subjected to stringent error correction and detection. If, upon receipt, the data transmitted over the data bus is essentially error-free, then the destination system may transmit a signal to the source system via a feedback line to switch the bit to indicate less stringent error detection and correction. Should the errors in the data frames increase, for example due to noise in the waveform on which the data is transmitted, requiring reinstatement of the more stringent error detection and correction, the destination system may send another signal to the source system to switch the bit back to its original setting. The feedback line would enable the destination system to communicate with the source system to switch the rigorousness of error detection and correction in response to the quality of the waveform carrying the data.

In describing the invention, reference has been made to a preferred embodiment and illustrative advantages of the invention. Those skilled in the art, however, and familiar with the instant disclosure of the subject invention, will recognize additions, deletions, modifications, substitutions, and other changes which will fall within the purview of the subject invention and claims.

What is claimed is:

1. A data communication method between a source and a destination, comprising the steps of:

evaluating, by the source, a data frame to determine vulnerability of the data therein;

setting, by the source, a flag to a first state to indicate vulnerable data which should be checked for errors by the destination;

setting, by the source, the flag to a second state to indicate invulnerable data which should not be checked for errors by the destination;

reading the flag at the destination;

performing, at the destination, error detection on frames for which the flag is set to the first state; and not performing, at the destination, error detection on frames for which the flag is set to the second state, wherein when error detection is performed on a plurality of frames and where at least a fixed percentage of the plurality of frames do not have an error located therein, the destination notifies the source to make its criteria for determining vulnerability of any data frame more stringent.

2. A method as recited in claim 1, wherein the destination notifies the source to make its criteria for determining vulnerability of any data frame more stringent by outputting a signal to the source over a dedicated feedback line.

3. The method of claim 1, further comprising the step of performing, by the destination, error correction on those frames for which error detection is performed.

4. A data communication method comprising the steps of:

evaluating, by a transmitting unit, a data bus to determine waveform quality of data included in a waveform transmitted on the data bus;

determining, by the transmitting unit, a scope of error detection and correction to be carried out by a receiving unit based on the determined waveform quality;

informing the receiving unit of the scope of error detection and correction, the informing being performed by the transmitting unit including at least one waveform quality bit together with the data sent in each of the data frames to the receiving unit; and processing the data frames in the receiving unit according to the determined scope of error correction and detection.

5. A method as recited in claim 4, wherein the determined scope of error detection and correction is one of a predetermined set of possible scopes of error detection and correction and is based on an amplitude level variation range of the waveform, the method further comprising the step of setting at least one bit in a data frame transmitted on the data bus to indicate the determined scope of error detection and correction.

* * * * *